Dec. 21, 1937.  E. HENDERSON ET AL  2,102,705
SEPARATOR
Filed May 8, 1935    2 Sheets—Sheet 1
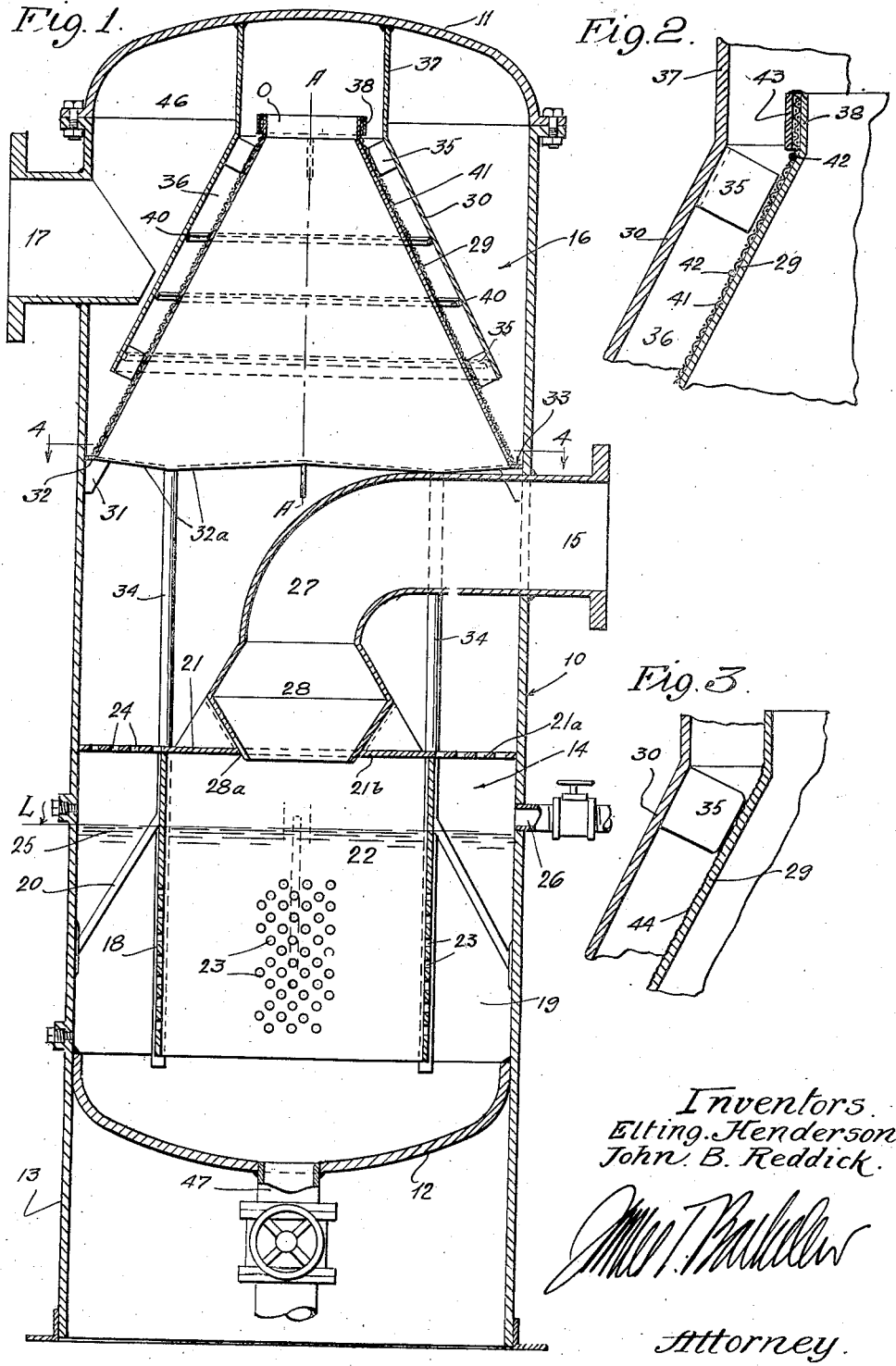
Inventors.
Elting Henderson
John B. Reddick.
Attorney.

Dec. 21, 1937.  E. HENDERSON ET AL  2,102,705
SEPARATOR
Filed May 8, 1935  2 Sheets-Sheet 2
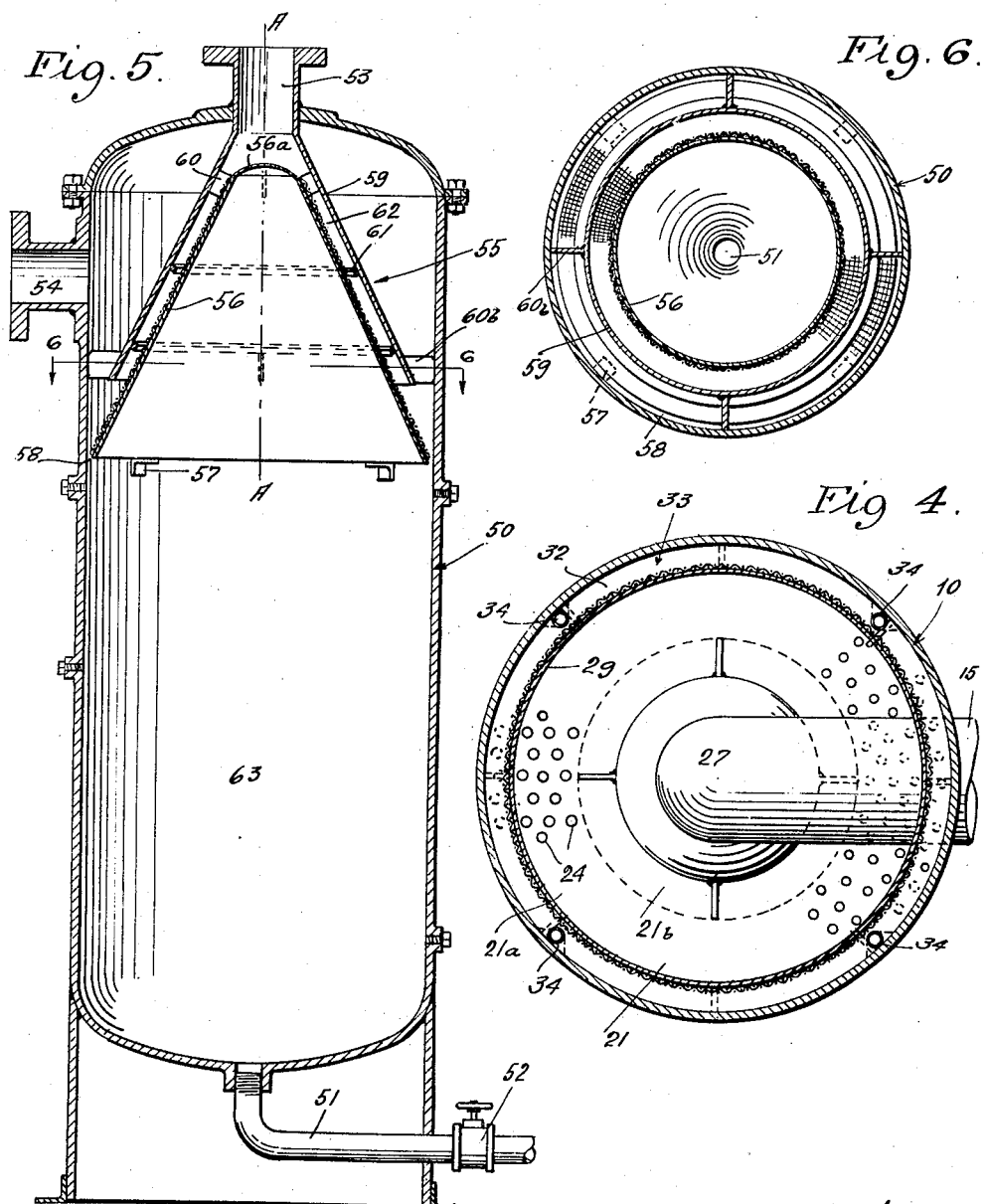
Inventors.
Elting Henderson
John B. Reddick.
Attorney.

Patented Dec. 21, 1937

2,102,705

UNITED STATES PATENT OFFICE 2,102,705

SEPARATOR

Elting Henderson, Huntington Park, and John B. Reddick, Sierra Madre, Calif., assignors to The Fluor Corporation, Ltd., Los Angeles, Calif., a corporation of California Application May 8, 1935, Serial No. 20,352

11 Claims. (Cl. 183—24)

This invention has to do generally with separators for removing entrainment from gas or vapors, and may be further characterized as being applicable to the removal of liquid or solid entrained particles, or both. In its capacity as a liquid and gas separator, the invention is particularly adaptable to the removal of liquid entrainment from natural gas. The invention also deals with an improved separator for accomplishing the successive removal of dust and liquid entrainment from the gas, and specifically by first effecting separation of the dust particles by entrainment within a liquid, and then removing from the gas all liquid initially entrained therein, as well as any liquid that may be carried over from the dust extracting operation.

One of our principal objects is to accomplish the removal of liquid entrainment by flowing the gas through an elongated separating passage of gradually increasing cross sectional area, so that the gas velocity progressively decreases, preferably to the point where the gas velocity is no longer sufficient to carry along the liquid particles and the latter will separate out. As the gas velocity diminishes, the larger liquid particles will be the first to precipitate, the smaller size particles settling out progressively as the velocity of gas flow diminishes to a minimum. In its preferred form, the liquid separator comprises a pair of spaced annular conical walls arranged substantially concentrically and forming an annular separating passage of downwardly increasing cross sectional area. The gas is introduced into the upper end of the annular separating passage and is caused to flow downwardly at progressively decreasing velocity, whereby, aided by gravity, the entrained liquid is caused to deposit on the wall of the passage. In order to minimize reentrainment of separated liquid, provision is made for promptly draining off and isolating the latter from the gas stream at the point at which the liquid leaves the separating passage.

For the purpose of removing dust from the gas, a stream of the dust laden gas is discharged downwardly at high velocity against the surface of a liquid body, causing the dust particles to become trapped in the liquid and settled to the bottom of the liquid chamber. We also provide means whereby the gas is required to pass through and in intimate and turbulent contact with the liquid so as to subject the gas to a scrubbing action which serves to finally deplete the gas of the last traces of dust.

All the above mentioned features of the invention as well as various additional objects and details, will be understood to better advantage from the following detailed description of certain typical and illustrative forms of the invention. In the description reference is had to the accompanying drawings, in which:

Fig. 1 is a sectional detail showing a combined dust and liquid entrainment separator embodying the invention;

Fig. 2 is an enlarged fragmentary view showing a top portion of the conical walls in the liquid separator section;

Fig. 3 is a view similar to Fig. 2 illustrating a variant form of construction;

Fig. 4 is a section on line 4—4 of Fig. 1;

Fig. 5 is a sectional detail, similar to Fig. 1, showing a variational form of the invention designed for liquid extraction only; and Fig. 6 is a section on line 6—6 of Fig. 5.

The combined dust and liquid entrainment separator shown in Fig. 1 comprises a vertically extending shell 10 having top and bottom enclosures 11 and 12, and a base 13 which may be conveniently formed as an extension of the shell 10. Within the lower portion of the shell is a dust separating unit, generally indicated at 14, which operates to accomplish preliminary removal of all the solid or dust particles carried by the gas stream introduced through inlet 15, and within the upper interior of the shell is a liquid separator, generally indicated at 16, by means of which the gas is finally depleted of liquid entrainment before flowing to the outlet 17. The dust extraction unit 14 comprises an apertured wall 18, which may be of any suitable shape, though preferably cylindric, annularly spaced at 19 from the wall of shell 10 and supported by suitable means, as for example braces 20. The cylindrical wall 18 is open at its lower end, as shown, and is attached, as by welding, at its upper end to a horizontally extending partition plate 21. Wall 18 may be provided with apertures in any suitable form and arrangement to permit the outward radial flow of gas from chamber 22 into the annular space 19, the apertures being shown typically in the form of closely spaced perforations 23 occupying the lower portion of the cylinder. The outer portion 21a of plate 21 above space 19 also is apertured to permit upward passage of gas therethrough and to effect intimate contact between liquid and gas in the manner hereinafter explained. This outer portion of wall 21 may conveniently consist of a perforated plate having gas passing apertures 24.

A body of liquid 25 is contained within the base of the shell, the normal liquid level L standing a short distance above the top perforations 23 in the cylindric wall 18. Before starting the separator into operation, the lower interior of the shell 10 may be filled with a suitable liquid, oil or water, up to the level L through an inlet 26. Gas introduced to the shell through inlet 15, and ordinarily under high pressure and at extremely high velocity, is discharged downwardly through pipe 27 and nozzle 28 against the surface of the liquid in chamber 22, the normal velocity pattern of the gas being distorted in passing through the elbow 27 and repatterned to a symmetrical form as it discharges through the nozzle 28. As illustrated, nozzle 28 projects through a central opening 28a in the central imperforate portion 21b of plate 21.

The high velocity gas stream is projected downwardly from nozzle 28 in a uniform velocity pattern and in a vertical stream occupying only the central portion of the chamber 22 as defined by the surrounding cylindrical wall 18. As the dust or any other solid matter carried by the gas comes in contact with the liquid, the solid particles are immediately surrounded by particles of the liquid and trapped in the liquid body so that they settle to the bottom of the shell. Some of the finer dust particles may remain suspended in the liquid, but the greater portion of the solids will promptly settle to the bottom of the liquid body.

The pressure and velocity force of the gas stream being discharged from nozzle 28 acts to depress the liquid level in chamber 22 to the point of uncovering the apertures 23 in the cylinder 18, the depth to which the liquid level is depressed and the extent to which the apertures are uncovered, depending upon the rate of gas flow. In any event, enough of the apertures 23 will become uncovered by the depressed liquid level to permit the gas to flow outwardly through the apertures into the annular chamber 19 wherein the gas, by reason of its fine state of division and high velocity flow in leaving the apertures 23, creates a turbulence within chamber 19 acting to largely convert the liquid therein to a froth. Upon reaching the perforated plate 21, the froth is reduced to a state of fine division by reason of the small size of apertures 24, and a body of fine froth will build up on the plate to some extent dependent upon the velocity of the gas. As the froth bubbles break, the liquid drains back into the base of the shell, or is refrothed by the rising gas, and the liberated gas passes upwardly through the central chamber 28 of the shell to the liquid separator 16. By reason of its extended and intimate contact with the liquid, the gas will carry considerable liquid entrainment, although it will be substantially entirely free from entrained dust particles, since all solids will previously have been entrapped and isolated from the gas stream in the liquid body 25.

In its preferred form, the liquid separator 16 comprises a pair of substantially concentric and annularly spaced frustro-conical walls 29 and 30, the former being supported on bracket lugs 31 and having a radially projecting bottom flange 32 welded to or in close engagement with the shell 10, and forming with the shell an annular trough 33. A plurality of drain tubes 34, four being shown as typical, serve to drain liquid collecting in trough 33, down into the liquid body in the base of the shell, the portions 32a of flange 32 at opposite sides of each drain tube being sloped toward the latter for the purpose of effecting prompt drainage of the liquid as soon as it reaches the trough 33.

The conical wall 30 is supported on wall 29 by lugs 35 engaging the outer surface of the latter, the size of the lugs determining the width of the annular separating passage 36 between the conical walls. In the form of the invention shown in Fig. 1, wall 30 carries a dome shell 37 which acts to deflect the gas stream flowing up through the interior shell 29 and the short cylindric extension 38 on its upper end, downwardly into the annular separating passage 36.

It is desirable that a substantial condition of turbulence exist in the gas stream flowing downwardly through the separating passage 36, and while such turbulence may be created by any suitable means, we have shown as a typical means for this purpose a series of annular baffle ribs 40 secured to and projecting inwardly from the inner surface of the outer conical wall 30. While, as will presently appear, the major factor influencing the separation of entrained liquid from the gas is the progressive and gradual reduction in the gas velocity produced by virtue of the shape and configuration of separating passage 36, it is also desirable, in furtherance of obtaining the highest separating efficiency, to accomplish an additional degree of separation by the provision, in the separating passage, of a roughened or irregular surface acting to induce separation of the liquid or mist particles by virtue of its surface irregularities.

Accordingly, in Fig. 1 we have shown a screen 41 applied flatly to the outer surface of the inner conical wall 29 and secured thereto by spot welds 42 at suitable intervals, and a sleeve 43 surrounding the upper cylindric extension 38. Screen 41 may be of any suitable mesh presenting the desired surface irregularities which will tend to cause the liquid particles in the gas stream sweeping down over the surface of the screen to separate out and drain over the surface of wall 29 into trough 33 at the base. Instead of laying a screen on the outside of wall 29 to provide a surface of the desired irregularity, we may instead roughen the outer surface of the conical wall itself, as illustrated at 44 in Fig. 3.

In the operation of the liquid separator 16, the gas stream discharged upwardly through opening O in the top or apex of the interior conical wall 29 and in alinement with its axis A—A, is impinged against the top wall of dome 37 and caused to make a complete reversal in its direction of flow as the gas passes down into the upper and small cross-sectional area end of separating passage 36. It will be noted that the cross sectional area of the annular passage 36 increases gradually in a downward direction to the point where, at the lower end of the outer wall 30, the cross sectional area of the passage is several times greater than the corresponding area at its upper or inlet end. Consequently, the velocity of the gas flow down through passage 36 gradually decreases, although a high degree of turbulence is maintained by reason of ribs 40, and the gas velocity decrease continues until at the lower end of passage 36 the velocity of the gas is below that at which the gas will carry entrained liquid.

Simultaneously with precipitation of the entrainment as a result of progressive decrease in the gas velocity, the liquid is caused to separate out by the action of the irregular surface presented by screen 41 or the roughened surface 44, see Fig. 3. By directing the gas in a downwardly flowing stream through passage 36, a gravity separating effect is also maintained by reason of the tendency for the liquid particles to drop from the gas. And since the velocity of the gas stream is always decreasing, an extended time interval is provided during which the particles are allowed to fall from the gas. As will readily appear, due to the fact that the gas and separated liquid are flowing in the same direction within passage 36, the possibility of reentrainment of separated liquid is greatly diminished, as compared with other types of apparatus in which counter-current or cross flow is maintained between gas and liquid being separated from it.

After the gas leaves the lower end of passage 36 and passes upwardly into chamber 46 and thence to outlet 17, additional conditions obtain to effect final separation of any entrained moisture, due to the two-fold effect of further reduction in the gas velocity and a second reversal in its direction of flow. As previously mentioned, all the separated liquid accumulates in trough 33 and promptly drains through tubes 34 to the base of the shell, any recirculation of gas in the drain tubes being prevented by liquid seals at their lower ends.

During operation of the separator, the sedimentary accumulation of solids in the base of the shell may be continuously or intermittently removed through the valve controlled drain line 47.

In Fig. 5 we show a variational form of the invention constructed exclusively for the separation of liquid entrainment in gas, without provision for dust removal. In this variant form, we use a liquid separator unit of the same general type as that previously described with reference to Fig. 1, although in some respects the construction has been materially simplified. Here the shell 50 is provided with a drain line 51 controlled by valve 52, a gas inlet 53 in axial alinement with the inner wall 56, and a gas outlet 54. The separating unit, generally indicated at 55, comprises an inner conical wall 56 supported within shell 50 on lugs 57, and having a small annular clearance from the wall of the shell as indicated at 58. An outer conical wall 59, carrying spacer lugs 60 and baffle ribs 61, as in the previously described form, connects at its upper end with the gas inlet 53, and is outwardly supported at its lower end by lugs 60b engaging the shell 50. In this instance the inlet gas is directed downwardly against the upper rounded end 56a of the inner cone and is deflected outwardly into the separating passage 62, the gas then flowing downwardly through the passage at gradually decreasing velocity with progressive separation of the entrained liquid taking place, all in the manner hereinabove described in connection with the separating unit 16 of Fig. 1. The separated liquid drains down into the bottom compartment 63 of the shell through the narrow clearance space 58, and thus becomes promptly isolated from the gas stream leaving passage 62 and rising toward the outlet 54.

It will be understood that the forms of the invention illustrated in the drawings are to be regarded merely as typical and illustrative of the invention, and that various changes and modifications may be made without departure from its spirit and intended scope.

We claim:

1. In a liquid and gas separator, spaced annular walls forming an elongated annular separating passage of gradually increasing cross sectional area downwardly in the direction of gas flow, an inlet from which gas carrying entrained liquid flows into the small cross sectional area end of said passage and then downwardly through the passage at progressively decreasing velocity, whereby entrained liquid is caused to separate from the gas and deposit on the wall of said passage, and to flow downwardly, aided by gravity, in the direction of gas flow, spaced transversely disposed baffles in said passage for developing a substantial degree of turbulence in the gas stream, means on the inner wall of said passage for providing an irregular surface to induce separation of the liquid from the gas stream and means for separately drawing off the separated liquid and gas.

2. In a liquid and gas separator, annularly spaced inner and outer conical walls forming an elongated annular separating passage of gradually increasing cross sectional area in the direction of gas flow, an inlet from which gas carrying entrained liquid flows into the small cross sectional area end of said passage and then through the passage at progressively decreasing velocity, whereby entrained liquid is caused to separate from the gas and deposit on the wall of said passage, spaced transversely disposed baffles in said passage for developing a substantial degree of turbulence in the gas stream, means on the inner wall of said passage for providing a roughened surface to induce separation of the liquid from the gas stream, and means for separately drawing off the separated liquid and gas.

3. In a liquid and gas separator, a shell, a pair of annularly spaced and substantially concentric conical walls within the upper interior of said shell and forming an annular separating passage of downwardly increasing cross sectional area, spaced transversely disposed baffles on the inner surface of the outer conical wall for developing a substantial degree of turbulence in the gas stream, the inner conical wall of said passage having an irregular surface to induce separation of the liquid from the gas stream, an inlet from which gas carrying entrained liquid flows into the upper end of said passage and then downwardly therethrough at progressively decreasing velocity, whereby the entrained liquid is separated and deposited on the inner conical wall, and means for separately drawing off the separated liquid and gas.

4. In a separator of the character described, a shell containing a body of liquid, means for discharging a stream of dust laden gas downwardly at high velocity against the surface of said liquid body, causing the dust particles to become trapped in the liquid, a gas outlet leading from said shell above said liquid body, and liquid separating means interposed between the first mentioned means and said outlet, said separating means comprising inner and outer annularly spaced and substantially concentric conical walls forming an annular separating passage of downwardly increasing cross sectional area, the gas flowing to the upper end of said passage through the interior of said inner conical wall.

5. In a separator of the character described, a shell containing a body of liquid, means for discharging a stream of dust laden gas downwardly at high velocity against the surface of said liquid body, causing the dust particles to become trapped in the liquid, a gas outlet leading from said shell above said liquid body, and liquid separating means interposed between the first mentioned means and said outlet, said separating means comprising inner and outer annularly spaced and substantially concentric conical walls forming an annular separating passage of downwardly increasing cross sectional area, the gas flowing to the upper end of said passage through the interior of said inner conical wall, and liquid drain tubes leading downwardly from the lower end of said passage into said liquid body.

6. In a separator of the character described, a shell containing a body of liquid, an apertured wall at the outside of said liquid body and spaced from said shell, means for discharging a stream of dust laden gas downwardly at high velocity against the surface of said liquid body, the liquid level being depressed by the gas to uncover apertures in said wall and the gas flowing outwardly through the apertures into a chamber in the upper interior of said shell, and liquid and gas separating means within said chamber, said separating means comprising inner and outer annularly spaced and substantially concentric conical walls forming an annular separating passage of downwardly increasing cross sectional area, the gas flowing to the upper end of said passage through the interior of said inner conical wall.

7. In a separator of the character described, a shell containing a body of liquid, an apertured wall at the outside of said liquid body and spaced from said shell, means for discharging a stream of dust laden gas downwardly at high velocity against the surface of said liquid body, the liquid level being depressed by the gas to uncover apertures in said wall and the gas flowing outwardly through the apertures into a chamber in the upper interior of said shell, and liquid and gas separating means within said chamber, said separating means comprising inner and outer annularly spaced and substantially concentric conical walls forming an annular separating passage of downwardly increasing cross sectional area, the gas flowing to the upper end of said passage through the interior of said inner conical wall, means for draining separated liquid from said passage into said liquid body, and a gas outlet communicating with said passage by way of a space between said outer conical wall and said shell.

8. In a liquid and gas separator, a closed outer shell, annularly spaced inner and outer conical walls within said shell and forming between them an elongated separating passage of downwardly increasing cross sectional area, a screen applied to the outer surface of said inner conical wall, means for introducing wet gas to the upper end of said passage, the gas leaving the lower end of said passage flowing upwardly into a chamber within said shell and around said outer wall, and an outlet pipe connected to the shell and through which gas is discharged from said chamber.

9. In a liquid and gas separator, a cylindric shell, annularly spaced inner and outer walls within said shell and forming an elongated annular separating passage of downwardly increasing cross sectional area, the length of said passage in the direction of gas flow being substantially in excess of the radial dimension of said shell and the gas flowing through said passage at progressively and substantially decreasing velocity such that liquid particles are caused to settle out of the gas stream by virtue of the reduced gas velocity, said inner wall projecting a substantial distance upwardly within said outer wall and extending below the outer wall, a wet gas inlet substantially in axial alinement with said inner wall and through which the gas is discharged into said passage, said shell forming a liquid chamber and a gas chamber into which the gas flows upwardly from the lower end of said passage, there being a relatively restricted passage through which liquid is caused to drain from the separating passage into said liquid chamber and a relatively open passage through which gas flows from the separating passage into said gas chamber, a gas outlet leading from said gas chamber, and means for drawing off separated liquid.

10. In a liquid and gas separator, a cylindric shell, annularly spaced inner and outer walls within said shell and forming an elongated annular separating passage of downwardly increasing cross sectional area, the length of said passage in the direction of gas flow being substantially in excess of the radial dimension of said shell and the gas flowing through said passage at progressively and substantially decreasing velocity such that liquid particles are caused to settle out of the gas stream by virtue of the reduced gas velocity, said inner wall being closed at its upper end and projecting a substantial distance upwardly within said outer wall and extending below the outer wall, a wet gas inlet substantially in axial alinement with said inner wall and through which the gas is discharged downwardly against the upper end of the inner wall and into said passage, said shell forming a liquid chamber and a gas chamber into which the gas flows upwardly from the lower end of said passage, there being a relatively restricted passage through which liquid is caused to drain from the separating passage into said liquid chamber and a relatively open passage through which gas flows from the separating passage into said gas chamber, a gas outlet leading from said gas chamber, and means for drawing off separated liquid.

11. In a liquid and gas separator, a cylindric shell, annularly spaced inner and outer conical walls within said shell and forming an elongated annular separating passage of downwardly increasing cross sectional area, the length of said passage in the direction of gas flow being substantially in excess of the radial dimension of said shell and the gas flowing through said passage at progressively and substantially decreasing velocity such that liquid particles are caused to settle out of the gas stream by virtue of the reduced gas velocity, said inner wall projecting a substantial distance upwardly within said outer wall and extending below the outer wall, a wet gas inlet substantially in axial alinement with said inner conical wall and through which the gas is discharged into said passage, said shell having a top closure and forming a liquid chamber and a gas chamber into which the gas flows upwardly from the lower end of said passage, there being a relatively restricted passage through which liquid is caused to drain from the separating passage into said liquid chamber and a relatively open passage through which gas flows from the separating passage into said gas chamber, means for supporting said outer conical wall from the top closure of said shell, a gas outlet leading from said chamber and means for drawing off separated liquid.

ELTING HENDERSON.
JOHN B. REDDICK.